US012623443B2

(12) United States Patent
Majima et al.

(10) Patent No.: US 12,623,443 B2
(45) Date of Patent: May 12, 2026

(54) PACKAGING BAG AND PACKAGING MULTILAYER FILM TO BE USED FOR PRODUCING THE PACKAGING BAG

(71) Applicant: TOYO SEIKAN GROUP HOLDINGS, LTD., Tokyo (JP)

(72) Inventors: Kenya Majima, Yokohama (JP); Seishi Yoshikawa, Yokohama (JP); Koki Shibata, Yokohama (JP); Atsushi Ebata, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 574 days.

(21) Appl. No.: 18/044,800

(22) PCT Filed: Sep. 10, 2021

(86) PCT No.: PCT/JP2021/033241
§ 371 (c)(1),
(2) Date: Sep. 27, 2023

(87) PCT Pub. No.: WO2022/054892
PCT Pub. Date: Mar. 17, 2022

(65) Prior Publication Data
US 2024/0009976 A1 Jan. 11, 2024

(30) Foreign Application Priority Data
Sep. 11, 2020 (JP) ................................. 2020-153226

(51) Int. Cl.
B32B 27/08 (2006.01)
B32B 7/12 (2006.01)
B32B 27/32 (2006.01)

(52) U.S. Cl.
CPC ................ B32B 27/08 (2013.01); B32B 7/12 (2013.01); B32B 27/32 (2013.01);
(Continued)

(58) Field of Classification Search
None
See application file for complete search history.

(56) References Cited

U.S. PATENT DOCUMENTS 4,971,864 A 11/1990 McCord
4,981,734 A * 1/1991 Akao ........................ B32B 7/12
428/35.9
(Continued)

FOREIGN PATENT DOCUMENTS

CN 1047319 A 11/1990
CN 1241487 A 1/2000
(Continued)

OTHER PUBLICATIONS

Communication dated Feb. 12, 2025 in Chinese Application No. 202180061852.X.
(Continued)

*Primary Examiner* — James C Yager
(74) *Attorney, Agent, or Firm* — Sughrue Mion, PLLC

(57) ABSTRACT

In a packaging bag (10) including multilayer films for packaging (5) including a heat-sealable resin layer (3) on a surface and formed by bonding two of the heat-sealable resin layers (3) of the multilayer films for packaging (5), oriented crystals are present in a seal portion (7) formed by bonding the heat-sealable resin layers (3).

11 Claims, 3 Drawing Sheets

(52) U.S. Cl.
CPC ....... *B32B 2250/03* (2013.01); *B32B 2250/24* (2013.01); *B32B 2307/31* (2013.01); *B32B 2307/51* (2013.01); *B32B 2307/54* (2013.01); *B32B 2307/558* (2013.01); *B32B 2553/00* (2013.01)

(56) References Cited

U.S. PATENT DOCUMENTS

| | | | |
|---|---|---|---|
| 6,503,588 | B1 | 1/2003 | Hayashi et al. |
| 2009/0263600 | A1 | 10/2009 | Miyashita et al. |
| 2019/0193904 | A1 | 6/2019 | Toyoshima et al. |

FOREIGN PATENT DOCUMENTS

| | | |
|---|---|---|
| CN | 1280912 A | 1/2001 |
| CN | 106183292 A | 12/2016 |
| JP | 56-82247 A | 7/1981 |
| JP | 5-104689 A | 4/1993 |
| JP | 8-165397 A | 6/1996 |
| JP | 2002-293372 A | 10/2002 |
| JP | 2003-057790 A | 2/2003 |
| JP | 2003-183462 A | 7/2003 |
| JP | 2004-001888 A | 1/2004 |
| JP | 2004-001889 A | 1/2004 |
| JP | 2004-243562 A | 9/2004 |
| JP | 2005-47234 A | 2/2005 |
| JP | 2005-131859 A | 5/2005 |
| JP | 2008-044356 A | 2/2008 |
| JP | 4844091 B2 | 12/2011 |
| JP | 2020-37187 A | 3/2020 |
| WO | 2017/038349 A1 | 3/2017 |
| WO | 2019/225282 A1 | 11/2019 |

OTHER PUBLICATIONS

Communication dated Jul. 31, 2024 issued by the European Patent Office in application No. 21866849.9.
International Search Report for PCT/JP2021/033241 dated Nov. 9, 2021.

* cited by examiner

PACKAGING BAG AND PACKAGING MULTILAYER FILM TO BE USED FOR PRODUCING THE PACKAGING BAG

CROSS REFERENCE TO RELATED APPLICATIONS

This application is a National Stage of International Application No. PCT/JP2021/033241 filed Sep. 10, 2021, claiming priority based on Japanese Patent Application No. 2020-153226 filed Sep. 11, 2020.

TECHNICAL FIELD

The present invention relates to a packaging bag and further relates to a multilayer film for packaging to be used for producing the packaging bag.

BACKGROUND ART

Cast polypropylene (CPP) films (also referred to as non-stretched polypropylene films or cast PP films) consisting of polypropylene and having heat sealability have excellent heat resistance and are used for producing pouches for containing various types of food. In recent years, more heat resistance and impact resistance are required for retort sterilization (heat steam sterilization), and impact polypropylene (hereinafter, may be referred to as impact PP) has been used for producing CPP films.

The impact PP, which is also referred to as block PP, an impact copolymer, or high-impact polypropylene, includes a rubber component, such as an ethylene-propylene copolymer (EPR) or a styrene-butadiene copolymer (SBR), dispersed in a matrix of homo-polypropylene or random polypropylene. Such a rubber component remarkably improves impact resistance strength.

A known retort pouch uses a multilayer film having a layer structure of biaxially oriented PET, biaxially oriented nylon, Al, and CPP, and the pouch has high impact resistance and hardly breaks when the pouch filled with contents is dropped from a high place. However, the pouch has a multilayer configuration of different materials and thus has poor recyclability. Then, in response to recent recycling, a polypropylene monomaterial pouch is awaited. Unfortunately, such a mono-material pouch does not use biaxially oriented PET or biaxially oriented nylon, thus is suitable for recyclability, but has low impact resistance.

For example, Patent Documents 1 and 2 propose a propylene-based resin composition in which a linear low-density polyethylene (LLDPE) is blended with a propylene impact copolymer (corresponding to impact PP) and disclose that such a resin composition can be used to obtain a film for heat sealing having various excellent properties. Patent Documents 1 and 2 improves physical properties of a film for heat sealing made of impact PP by blending a linear low-density polyethylene with impact PP, but a packaging bag obtained by using such a heat-sealable resin layer still has unsatisfactory bag drop strength.

CITATION LIST

Patent Literature

Patent Document 1: JP 4844091 B
Patent Document 2: WO 2017/038349

SUMMARY OF INVENTION

Technical Problem

In response to the above problems, an object of the present invention is to provide a packaging bag having a remarkably improved bag drop strength and a multilayer film for packaging for obtaining the packaging bag.

Another object of the present invention is to provide a packaging bag having an enhanced bag drop strength without the recyclability impaired and a multilayer film for packaging for obtaining the packaging bag.

Solution to Problem

The present inventors have found that when using a multilayer film for packaging including a heat-sealable resin layer on a surface and laminating the multilayer films to face the heat-sealable resin layers each other to produce a packaging bag, the bag drop strength is improved without the recyclability impaired when oriented crystals are present in a seal portion (that is, a bonded portion of the multilayer films).

According to the present invention, provided is a packaging bag including multilayer films for packaging including a heat-sealable resin layer on a surface and formed by bonding two of the heat-sealable resin layers of the multilayer films. In the packaging bag, oriented crystals are present in a seal portion formed by bonding the heat-sealable resin layers.

The packaging bag according to the present invention preferably applies the following aspects.

(1) The multilayer film for packaging includes a stretched film for reinforcing strength for allowing the oriented crystals to be present in the seal portion.

(2) The stretched film for reinforcing strength contains an olefin resin and a reinforcing resin having a melting point higher than a melting point of the olefin resin.

(3) The stretched film for reinforcing strength is formed of a blended material of the olefin resin and the reinforcing resin.

(4) The stretched film for reinforcing strength is a laminate of a layer of the olefin resin and a layer of the reinforcing resin.

(5) The reinforcing resin is polyamide, polyester, or an ethylene-vinyl alcohol copolymer.

(6) The multilayer film for packaging includes a substrate film for improving recyclability in addition to the stretched film for reinforcing strength.

(7) An amount of 80 mass % or more of the olefin resin is contained.

(8) The heat-sealable resin layer is a non-stretched molded body containing an impact polypropylene component and has a loss tangent (tan $\delta$) of more than 0.0594 at 5° C. and a storage elastic modulus (E') of more than 1 MPa at 110° C. in a test measurement of dynamic viscoelasticity.

(9) The non-stretched molded body contains an impact polypropylene component (A) in which an ethylene-propylene copolymer is dispersed in polypropylene and linear low-density polyethylene (B).

(10) The non-stretched molded body contains 8 mass % or more of a xylene-soluble fraction percentage derived from the ethylene-propylene copolymer.

(11) The non-stretched molded body contains 20 mass % or less of the linear low-density polyethylene (B).

According to the present invention, also provided is a multilayer film for packaging including a heat-sealable resin layer and a support film laminated on the heat-sealable resin layer with an adhesive layer interposed. In the multilayer film for packaging, the support film contains a stretched film for reinforcing strength containing an olefin resin and a reinforcing resin having a melting point higher than a melting point of the olefin resin.

That is, the above-described packaging bag can be obtained by attaching the above-described multilayer film for packaging by heat sealing.

Advantageous Effects of Invention

The packaging bag according to the present invention is obtained by heat-sealing a multilayer film for packaging including a substrate layer and the heat-sealable resin layer and has an important feature in that the oriented crystals are present in the seal portion (a portion formed by bonding the heat-sealable resin layers). The oriented crystals being present in the seal portion means that a stretched portion is present in the multilayer film for packaging and that the orientation due to stretch is not completely lost depending on heat sealing.

That is, the packaging bag with improved recyclability according to the present invention does not lose the oriented crystals in the seal portion. This remarkably improves the bag breakage strength is. For example, referring to examples and comparative examples in which a bag drop test (horizontal bag drop test) was performed with a certain amount of water filled, the packaging bag of Comparative Example 1 in which no oriented crystals are present in the seal portion has the number of times of non-breakage at the horizontal bag drop of 5, whereas the packaging bag of Example 1 in which the oriented crystals are present in the seal portion has the number of times of non-breakage at the horizontal bag drop of more than 10.

The largest advantage of the packaging bag according to the present invention in which the bag drop strength is improved by allowing the oriented crystals to be present in the seal portion in this manner is that the packaging bag can be produced by using a multilayer film for packaging formed mainly of the same resin material. This allows the recyclability to be significantly improved. For example, the oriented crystals can be present in a seal portion of a packaging bag formed by using a multilayer film composed mainly of an olefin resin such as polypropylene, 80 mass % or more of the packaging bag can be composed of the olefin resin, and extremely high recyclability can be ensured.

DESCRIPTION OF EMBODIMENTS

Figure 1:
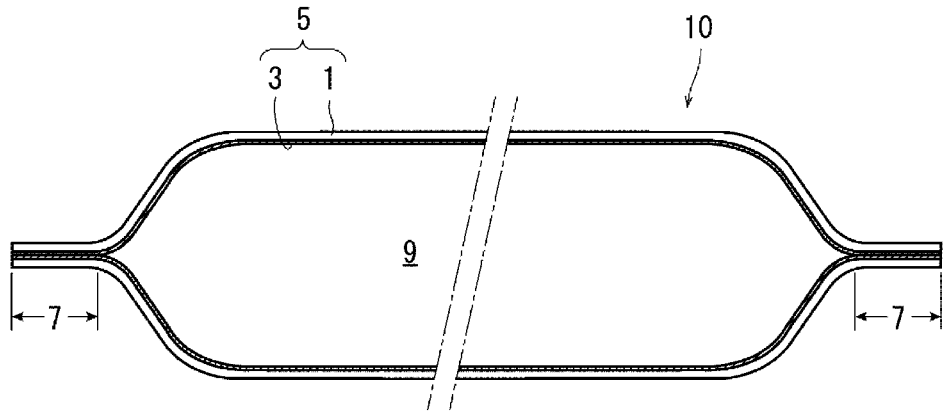
FIG. 1 is a diagram illustrating a schematic cross-section of a packaging bag according to the present invention.

Referring to FIG. 1, roughly speaking, the packaging bag according to the present invention indicated by 10 as a whole is obtained by heat-sealing a multilayer film for packaging 5 including a support film 1 and a heat-sealable resin layer 3 to keep a form as a bag. As can be seen from FIG. 1, the packaging bag 10 includes, at a peripheral edge portion, a seal portion 7 formed by heat sealing (thermal fusion) of the heat-sealable resin layers 3.

Such a packaging bag 10 is filled with various contents 9, such as liquid, paste-like, and powdery or granular contents, and needs to have high bag drop strength so as not to be broken when dropped.

The packaging bag 10 according to the present invention includes oriented crystals present in the seal portion 7, ensuring a high bag drop strength. That is, when the packaging bag 10 is dropped, the contents 9 generates stress in a direction of opening the seal portion 7. In the present invention, the oriented crystals are present in the seal portion 7, thus breakage of the seal portion 7 due to such stress is effectively inhibited, and a high bag drop strength is exhibited.

The oriented crystals present in the seal portion 7 can be confirmed by, for example, two dimensional X-ray diffraction.

The present invention designs the layer structure of the multilayer film 5 to be used for forming the packaging bag 10 to allow disappearance of the oriented crystals due to heat sealing to be avoided. Such a layer structure can perform heat-sealing conditions by using a seal bar in the same temperature range as usual and can further provide heat resistance and impact resistance to the packaging bag 10.

In the present invention, the support film 1 laminated on the heat-sealable resin layer 3 includes a stretched film for reinforcing strength for allowing the above-described oriented crystals to be present in the seal portion 7 and a substrate film for ensuring recyclability, and has a different layer structure depending on the positional relationship between the stretched film for reinforcing strength and the substrate film.

Figure 2:
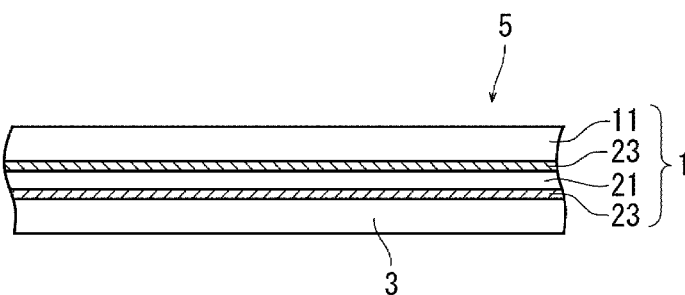
FIG. 2 is a schematic cross-sectional view illustrating an example of a multilayer film for packaging according to the present invention.
Figure 3:
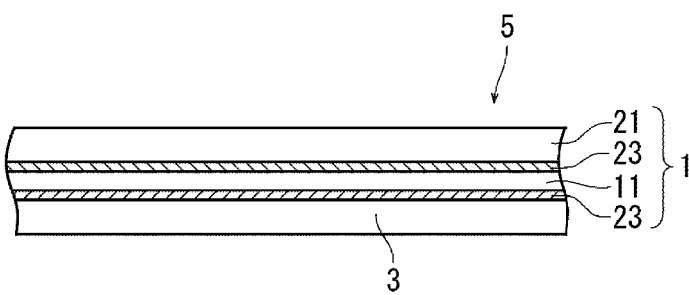
FIG. 3 is a schematic cross-sectional view illustrating another example of a multilayer film for packaging according to the present invention.

FIGS. 2 and 3 illustrate the layer structure of such a multilayer film 5.

The support film 1 provided in the multilayer film 5 illustrated in FIG. 2 has a layer structure in which the stretched film for reinforcing strength 21 is sandwiched by the adhesive layers 23, 23 between the substrate film 11 and the heat-sealable resin layer 3.

In FIG. 3, a support film 1 has a layer structure in which the substrate film 11 is sandwiched by the adhesive layers 23, 23 between the stretched film for reinforcing strength 21 and the heat-sealable resin layer 3.

Either of the embodiments in FIGS. 2 and 3 can leave the oriented crystals in the seal portion 7 and increase the bag drop strength.

The substrate film 11;

The substrate film 11 is intended to have the recyclability, is basically composed mainly of the olefin resin similar to the heat-sealable resin layer 3, and is a resin film produced by a known means such as extrusion molding. When, in particular, gas barrier properties are required, a propylene film having an inorganic coating film is used, and when not required, a common propylene film is used from the viewpoint of strength, heat resistance, cost, moldability, and the like.

Of course, the substrate film 11 may be omitted when the recyclability is not required.

A typical propylene resin is polypropylene (homopolymer of propylene) but may be a random or block copolymer with an α-olefin or cyclic olefin, such as ethylene, 1-butene or 4-methyl-1-pentene, copolymerized as long as the characteristics of polypropylene are not impaired.

In addition, the substrate film 11 formed of the propylene resin is preferably stretched uniaxially or biaxially. Although the substrate film 11 is not used for allowing oriented crystals to be present in the seal portion 7, the stretched substrate film 11 can further improve the strength. The stretching ratio of the stretched film forming the substrate film 11 is such that no film breakage due to overstretching occurs and is usually about 2 to 5 times.

The thickness of the substrate film 11 described above is an appropriate thickness depending on, for example, the capacity of the pouch to be finally produced, and is typically 10 μm or more.

To improve the gas barrier properties, a gas barrier resin such as an ethylene-vinyl alcohol copolymer may also be laminated on the substrate film 11, in particular, the substrate film 11 formed of a propylene resin, or an inorganic coating film may be formed on the surface of the substrate film 11.

A layer of such a gas barrier resin is laminated on the substrate film 11 by using an adhesive resin as typified by an olefin resin (for example, polyethylene or polypropylene) modified with an unsaturated carboxylic acid, such as maleic acid, or, for example, a urethane or epoxy dry laminating adhesive. The inorganic coating film is formed by physical vapor deposition as typified by, for example, sputtering, vacuum vapor deposition, or ion plating, chemical vapor deposition as typified by plasma CVD, or the like, and is mainly formed of an inorganic vapor deposition film or an inorganic coated film formed by coating by wet coating, for example, various metals or metal oxides, such as silicon oxide and aluminum oxide. Further, the above-described inorganic coated film may be provided on the above-described vapor deposition film. Such an inorganic coating film, which is formed of an inorganic substance, exhibits higher oxygen barrier properties than the gas barrier resin, such as the ethylene-vinyl alcohol copolymer.

The stretched film for reinforcing strength 21;

As illustrated in FIGS. 2 and 3, the stretched film for reinforcing strength 21 is provided between the substrate film 11 and the heat-sealable resin layer 3 or on the outermost layer side of the packaging bag 10. To form the multilayer film 5 having such a layer configuration, provided are an adhesive layer 23 for bonding the substrate film 11 and the stretched film for reinforcing strength 21 and an adhesive layer 23 for bonding the stretched film 21 or the substrate film 11 and the heat-sealable resin layer 3.

As an adhesive for forming such an adhesive layer 23, an adhesive resin as typified by the olefin resin modified with an unsaturated carboxylic acid, such as maleic acid, or, for example, the urethane or epoxy dry laminating adhesive is used.

Examples of the urethane dry laminating adhesive can include an adhesive consisting of a reaction product of isocyanate and a (meth)acrylic compound or polyester polyol. The adhesive usually contains a known curing catalyst such as an amine catalyst, a metal catalyst or a phosphoric acid-modified compound. The amount of the curing catalyst is set according to the type of curing catalyst so that a dense cured film (adhesive layer) can be formed at a temperature and time without thermal deformation of the underlying resin.

The epoxy adhesive contains a liquid resin having an epoxy group in a molecule and an epoxy curing agent.

Typical examples of the liquid resin having an epoxy group in the molecule include a liquid resin obtained by reacting epichlorohydrin with a phenol compound, an amine compound, a carboxylic acid, or the like, and a liquid resin obtained by oxidizing an unsaturated compound such as butadiene with an organic peroxide or the like, and any type of liquid resin can be used. Specific examples thereof can include a bisphenol A type or bisphenol F type epoxy resins, a novolac type epoxy resin, a cyclic aliphatic type epoxy resin, a long chain aliphatic type epoxy resin, a glycidyl ester type epoxy resin, and a glycidyl amine type epoxy resin.

As the epoxy curing agent, known epoxy curing agents such as an amine curing agent, an acid anhydride, and a polyamide can be used, and an aromatic polyamine as typified by metaphenylene diamine is particularly preferable. The amount ratio between the epoxy resin and the curing agent may be set so that a sufficient cured film is formed according to the epoxy equivalent of the epoxy resin.

Accordingly, the adhesive layer 23 made of such an adhesive is present on at least one side of the stretched film for reinforcing strength 21. The thickness of the adhesive layer 23 formed in this manner is usually from 5 to 30 μm for the adhesive layer 23 as typified by a modified olefin resin and from about 0.1 to 10 μm for a urethane or epoxy adhesive layer.

In the present invention, the oriented crystals in the stretched film for reinforcing strength 21 remain in the seal portion 7, and the bag drop strength can be greatly improved.

Such a stretched film for reinforcing strength 21 is an oriented molded product of a blended material or a laminate of an olefin resin and a reinforcing resin having a melting point higher than that of the olefin resin. That is, when the packaging bag 10 is molded by heat-sealing the heat-sealable resin layer 3 described later, the heat sealing causes the molecular orientation in the stretched film for reinforcing strength 21 to remain, achieves high strength with the molecular orientation, and can greatly improve the bag drop strength as compared with a bag made only of a propylene resin.

Examples of the olefin resin include random or block copolymers of α-olefins such as low-density polyethylene, high-density polyethylene, polypropylene, poly (1-butene), poly (4-methyl-1-pentene), ethylene, propylene, 1-butene, and 4-methyl-1-pentene, cyclic olefin copolymers, and the above-described impact polypropylene. In particular, from the viewpoint of heat resistance, propylene resins such as polypropylene and copolymers of propylene and other α-olefins are suitable.

The reinforcing resin is not particularly limited as long as it has a melting point higher than that of the olefin resin, but practically, a polyamide resin, a polyester resin, and an ethylene-vinyl alcohol copolymer resin are suitably used from the viewpoint that stretching in the presence of the olefin resin can be performed.

Examples of the polyamide resins can include nylon 6, nylon 6-6, nylon 6-10, nylon 11, nylon 12, nylon 13, nylon 6/nylon 6,6 copolymers, aromatic nylons (for example, polymetaxylylene adipamide), and amorphous nylons (for example, nylon 6I/6T). Examples of the polyester resin can include polyethylene terephthalate (PET), polybutylene terephthalate, and polyethylene naphthalate (PEN). As the ethylene-vinyl alcohol copolymer resins, those having an ethylene copolymerization ratio in the range of 20 mol % to 40 mol % are preferably used.

The blended material of the olefin resin and the reinforcing resin used for forming the stretched film for reinforcing strength 21 usually has a mass ratio of the olefin resin: the reinforcing resin in a range of about 50:50 to 90:10. That is, the excessively large amount of the reinforcing resin has difficulty in stretching and severely loses the recyclability of the packaging bag. The small amount of the reinforcing resin reduces the amount of the oriented crystals present in the seal portion and may have insufficient improvement of the bag drop strength.

In the blended material, a compatibilizer for uniformly and finely dispersing the olefin resin and the reinforcing resin can also be used. Examples of such a compatibilizer can include an acid-modified olefin resin or an imine-modified olefin resin, and usually, about 10 to 60 mass % of the compatibilizer is preferably blended in the blended material. This can stably perform the stretching.

The blended material is produced by melt-kneading in an extruder, and is produced by stretching a film molded by extrusion at a glass transition point (Tg) or higher than the olefin resin and lower than the melting point, for example. The stretching may be performed in a uniaxial direction or a biaxial direction, and the stretching ratio is preferably 2 times or more.

The thickness of the stretched film for reinforcing strength 21 described above is not particularly limited and may be appropriately set according to the thickness of the substrate layer 1 which is set according to the capacity and the like of the intended pouch. In general, the thickness is preferably 5 μm or more, and particularly preferably in the range of about 10 to 20 μm.

The stretched film for reinforcing strength 21 may have, for example, a laminated structure in which an olefin resin layer and a reinforcing resin layer are laminated. In such a laminated structure, the thickness ratio of the olefin resin layer to the reinforcing resin layer is usually in a range of about 1/1 to 3/1. That is, when the thickness of the reinforcing resin is excessively large, the recyclability of the packaging bag is largely lost, and when the amount of the reinforcing resin is small, the amount of the oriented crystals present in the seal portion becomes small and there is a possibility that the improvement of the bag drop strength becomes insufficient.

The stretched film for reinforcing strength 21 having the above-described laminated structure is produced by co-extruding an olefin resin and a reinforcing resin having a melting point higher than that of the olefin resin with the above-described adhesive interposed therebetween if necessary, and then stretching the co-extruded product at a temperature of, for example, the glass transition point (Tg) or more and less than the melting point of the olefin resin. The stretching may be performed in a uniaxial direction or a biaxial direction, and the stretching ratio is preferably 2 times or more.

That is, from the viewpoint of the recyclability, a large amount of the reinforcing resin cannot be used. Therefore, the usage of the reinforcing resin can be reduced by co-extruding and co-stretching the olefin resin as the support material. For example, in the stretched film for reinforcing strength 21 having this laminated structure, the thickness of the reinforcing resin stretched film can be suppressed to about 5 μm, and the oriented crystals can be left while ensuring the recyclability, and the bag drop strength can be greatly improved.

In such a stacking type stretched film for reinforcing strength, the reinforcing resin layer side may be positioned on the heat-sealable resin layer side, or the olefin resin layer side may be positioned on the heat-sealable resin layer side.

The heat-sealable resin layer (sealant) 3;

The heat-sealable resin layer 3 is laminated on the adhesive layer 23 applied on the stretched film 21, and the adhesive is heated and cured in this state. Since the heat-sealable resin layer 3 is easily melted by heating and is immediately solidified by cooling, a packaging bag (pouch 10) can be produced by thermally bonding (heat-sealing) the multilayer film 5 (heat-sealable resin layer 3) to each other by utilizing this phenomenon.

In the present invention, the heat-sealable resin layer 3 may be formed of a normal polyolefin, for example, polypropylene, but desirably has dynamic viscoelastic characteristics in order to impart impact resistance and heat resistance to the packaging bag 10, and for example, the loss tangent (tan δ) at 5° C. in dynamic viscoelasticity measurement at 10 Hz is preferably more than 0.0594. This can enhance the impact resistance in a low temperature range. That is, by having such viscoelasticity at 5° C., the heat-sealable resin layer 3 can obtain good low-temperature impact resistance in a low-temperature region (around 5° C.), and is very difficult to break. Also, the heat-sealable resin layer 3 must have a storage elastic modulus (E') at 110° C. in dynamic viscoelasticity measurement at 10 Hz greater than that at 1 MPa. That is, since the storage elastic modulus (E') at 110° C. has such a large value, the heat-sealable resin layer 3 exhibits an appropriate elasticity in a high temperature region (around 110° C.) and maintains a seal strength sufficient for sealing a pouch even at a high temperature. Therefore, the packaging bag 10 has a high seal strength at a high temperature, is effectively prevented from being broken by heating in a microwave oven, and can be effectively heated in a microwave oven.

In the present invention, a cast film containing impact polypropylene (impact PP) (hereinafter, simply referred to as a CPP film) is used as the heat-sealable resin layer 3 having viscoelasticity as described above, and the composition of the impact PP and the kind and amount of the modified resin component used in combination may be adjusted.

That is, the CPP film having the above-described viscoelasticity is obtained by melt extrusion of a resin composition containing the impact PP component (A) and the modified resin component (B).

Impact PP Component (A);

The impact PP component (A) is made of impact polypropylene (impact PP), and this impact PP has a structure in which an ethylene-propylene copolymer (EPR) is dispersed particularly in homo or random polypropylene. That is, since EPR is dispersed in polypropylene, impact resistance is imparted. As the rubber component dispersed in polypropylene, a styrene-butadiene copolymer (SBR), an ethylene-propylene-butene copolymer (EPBR), and the like are known in addition to EPR, and even those other than EPR can improve impact resistance at low temperature (tan δ at 5° C. is larger than 0.0594), but EPR is optimal.

The impact PP as described above has a melt flow rate (MFR, 230° C.) in a range approximately of 0.5 to 10 g/10 min from the viewpoint, such as film moldability (extrusion moldability).

The EPR content in the impact PP can be represented by a xylene soluble fraction percentage when the CPP film used for forming the heat-sealable resin layer 3 is dissolved in boiling xylene, and the xylene-soluble fraction percentage is preferably 8 mass % or more, particularly in the range of 8 to 20 mass %. That is, when the xylene-soluble fraction percentage is smaller than the above range, the impact resistance of the pouch is lowered because the amount of EPR is small. On the other hand, if the soluble fraction is excessively high, insufficient heat resistance or poor appearance of the pouch may occur.

Furthermore, the limiting viscosity measured for the xylene-soluble fraction (EPR) (measured for tetralin at 135° C. as a solvent) is preferably in the range of 1.0 to 2.9 dl/g.

This intrinsic viscosity is a parameter corresponding to the molecular weight of the EPR in the impact PP. When this value is out of the above range, the impact resistance tends to be unsatisfactory. This is probably because the size of the EPR molecule is unnecessarily large or unnecessarily small, and therefore the characteristics of the modified resin component (B) described below are not sufficiently exhibited.

Modified Resin Component (B);

The modified resin component (B) is a component for sufficiently exerting the effect of improving impact properties by EPR by enhancing the compatibility between polypropylene (PP) and the ethylene-propylene copolymer (EPR) in impact PP described above and greatly improving the dispersibility of EPR in PP.

As such a modified resin component (B), linear low-density polyethylene (LLDPE) is preferably used. This LLDPE is a linear low-density polyethylene having a density in the range of 0.860 to 0.925 g/cm$^3$. For example, a small amount (about several %) of an α-olefin such as butene-1, hexene-1,4-methylpentene-1 is copolymerized with ethylene to reduce the density, and the molecular linearity is extremely high.

In addition, since this LLDPE is used by being mixed with the impact PP, one having an MFR (190° C.) of 1.0 to 15 g/10 min is suitably used in order not to impair the film moldability.

Furthermore, the LLDPE preferably has a content of α-olefin as a comonomer of 12 mol % or less, and a number average molecular weight of 10000 or more in terms of polystyrene as measured by GPC. That is, when the content of the α-olefin as a comonomer is large or when the number average molecular weight is small and the low molecular weight component is contained in a large amount, the oil resistance and the flavor property to the contents are deteriorated when used as a pouch.

In the LLDPE (B) described above, the composition of the film is preferably designed so that the amount of LLDPE in the CPP film (corresponding to the amount of LLDPE in the heat-sealable resin layer 5) is 20 mass % or less. That is, if the content of LLDPE is excessive, the blocking resistance and heat resistance of the film may be impaired.

In addition, in the resin composition used for forming the CPP film, an additive known per se can also be blended.

The CPP film including the above-described impact PP component is produced by dry-blending each component, feeding this composition to an extruder to melt-knead the composition, melt-extruding the blended material into a film shape from a T-die, and bringing the extruded film-shaped melt into contact with a cooling roll to solidify the melt and a solidified film is wound.

The thickness of such a CPP film is not particularly limited, and is usually preferably in the range of 20 to 100 μm, and particularly preferably in the range of 50 to 80 μm in consideration of rigidity, unsealing property, and the like.

As described above, the multilayer film 5 in which the oriented crystals are present in the seal portion 7 to greatly improve the bag drop strength has the layer structure illustrated in FIGS. 2 and 3, and particularly preferably has the following structure.

In the following structures, the following abbreviations are used.

SUB: Substrate film 11
STRG: Stretched film for reinforcing strength 21
SEAL: Heat-sealable resin layer, preferably CPP film
AD: Adhesive SUB (inorganic coating film)/AD/STRG/AD/SEAL
or
STRG/AD/SUB (inorganic coating film)/AD/SEAL In the above example, the inorganic coating film may be provided on any surface of the substrate film 11 (SUB).

In the present invention, a printed layer may be laminated on the outer surface side of the substrate film 11.

Production of Packaging Bag 10

The multilayer film 5 having the above-described layer structure is bonded by heat-sealing in the heat-sealable resin layer 3 to produce a bag, thereby obtaining the packaging bag 10.

Bag production is carried out by known means. For example, an empty pouch is produced by three-way seal using two multilayer films 5, contents are filled from the opening, and the opening is finally closed by heat-sealing.

It is also possible to produce an empty pouch by folding back one sheet of the multilayer film 5 and heat-sealing both side edges. In this case, it is not necessary to heat-seal one of the three-way seal. An empty pouch can also be produced by using multilayer films 5 dedicated to the sides or to the bottom. Such a method is advantageous in increasing the volume of the pouch or providing a standing property.

The heat-sealing at the time of bag production is carried out by heating so as to melt the heat-sealable resin layer 3 and pressing with a seal bar. This forms the seal portion 7 in which the peripheral portions of the multilayer film 5 are bonded to each other, and in the seal portion 7, oriented crystals are present in at least one of the olefin resin or the reinforcing resin having a melting point higher than that of the olefin resin in at least the stretched film for reinforcing strength 21 (or a multilayer strength-reinforcing body).

For example, when the content is food, the packaging bag 10 obtained in this manner and filled with the content is subjected to a retort treatment (sterilization treatment with heated steam at 100 to 130° C.) and then provided for sale.

To have the recyclability, in particular, in the packaging bag 10 according to the present invention, a content of olefin resin in the substrate film 11 is preferably increased in the multilayer film 5, and with a layer configuration in which a content of olefin resin in the stretched film for reinforcing strength 21 is increased (the usage of reinforcing resin is decreased as much as possible), the content of olefin resin in the packaging bag 10 is preferably 80 mass % or more, and particularly 85 mass % or more. That is, in the present invention, even the usage of the olefin resin increased in this manner can effectively avoid a decrease in strength due to retort sterilization and increase the bag drop strength.

EXAMPLES

The excellent effects according to an embodiment of the present invention will be described in the following examples.

Various materials and various measurement methods employed in the following experiments are as follows.

Substrate film A
    Transparent vapor-deposited oriented polypropylene film
        Thickness: 20 μm
        Melting point: 163.8° C.
Stretched Film Material for Reinforcing Strength
    Olefin resin;
        Polypropylene resin (a1)
            E-200 GV (homo PP) available from Prime Polymer
            Co., Ltd.
            Melting point: 164.1° C.
            MFR: 1.6 g/10 min (230° C., 2.16 kg)

Adhesive resin (b1);

QB550 available from Mitsui Chemicals, Inc.

Melting point: 141.6° C.

MFR: 2.8 g/10 min (230° C., 2.16 kg)

Density: 890 kg/m$^3$

Adhesive resin (b2);

QB500 available from Mitsui Chemicals, Inc.

Melting point: 160.1° C.

MFR: 3.0 g/10 min (230° C., 2.16 kg)

Reinforcing resin;

Polyamide resin (c1)

A1030BRT available from UNITIKA LTD.

Melting point: 219.7° C.

MFR: 8.2 g/10 min (250° C., 2.16 kg)

Density: 1130 kg/m$^3$

Polyamide resin (c2)

1013B available from Ube Industries, Ltd.

Melting point: 221.0° C.

MFR: 51.2 g/10 min (250° C., 2.16 kg)

Density: 1140 kg/m$^3$

Ethylene-vinyl alcohol copolymer (c3)

J171B available from KURARAY CO., LTD

Melting point: 180.1° C.

MFR: 6.2 g/10 min (230° C., 2.16 kg)

Density: 1140 kg/m$^3$

Production of Compound-Type Films (A) to (C)

A polypropylene resin (a1), an adhesive resin (b1), and a reinforcing resin were charged into a hopper of a twin-screw extruder equipped with a T-die. The mixture was melt-kneaded in an extruder, the screw rotation speed was set to 100 rpm, and the mixture was discharged from a T-die into a film shape and brought into contact with a cooling roll, solidified, and wound up to obtain a compound-type film having an average film thickness of 170 μm. This film is a non-stretched film for producing a strength reinforcing layer (stretched film for reinforcing strength).

The type of reinforcing resin used, the temperature (C1 to C4) of the cylinder of the extruder, the temperature of the T-die, and the cooling roll were set to the conditions shown in Tables 1 and 2 below.

TABLE 1

| | Composition ratio (weight ratio) |
|---|---|
| Compound film (A) | a1/b1/c1 = 1/1/1 |
| Compound film (B) | a1/b1/c2 = 2/0.15/0.85 |
| Compound film (C) | a1/b1/c3 = 1/1/1 |

TABLE 2

| | C1 (° C.) | C2 (° C.) | C3 (° C.) | C4 (° C.) | T die (° C.) | Cooling roll (° C.) |
|---|---|---|---|---|---|---|
| Compound film (A) | 170 | 255 | 265 | 275 | 275 | 50 |
| Compound film (B) | | | | | | |
| Compound film (C) | 165 | 220 | 220 | 230 | 230 | 45 |

Production of Coextruded Films A and B

A resin was charged into a hopper of a single-screw extruder with a three-layer T-die. The mixture was melt-kneaded in an extruder, discharged from a T-die into a film shape, brought into contact with a cooling roll, solidified, and wound up to obtain a coextruded film having an average film thickness of 190 μm. This film is a non-stretched film for producing the multilayer strength reinforcing films D and E. The resin material, the temperature (C1 to C4) setting of the cylinder of the extruder, the temperature setting of the T-die, the cooling roll, and the screw rotation speed were set to the conditions shown in Table 3 below.

TABLE 3

| Resin | C1 (° C.) | C2 (° C.) | C3 (° C.) | C4 (° C.) | T die (° C.) | Cooling roll (° C.) | Screw (rpm) |
|---|---|---|---|---|---|---|---|
| a1 | 180 | 220 | 220 | 230 | 250 | 45 | 30 |
| b1 or b2 | | | | | | | 10 |
| c1 | 200 | 240 | 250 | 250 | 250 | | 25 |

Production of Stretched Films for Reinforcing Strength A to E

The stretched films for reinforcing strength A to E were obtained by using a biaxial stretching device (available from Toyo Seiki Seisaku-sho, Ltd.). The stretching conditions are shown in Table 4 below.

Heat-setting was carried out for 2 minutes (or 3 minutes) by bringing a plate set at 200° C. (or 210° C.) close to the film at a distance of 1.5 cm. The obtained stretched film for reinforcing strength (hereinafter, may be simply referred to as a stretched film) was subjected to a corona discharge treatment to make the surface hydrophilic.

TABLE 4

| Stretched film | Substrate | Heating | Orientation method | Speed (m/min) | Magnification (times) |
|---|---|---|---|---|---|
| Stretched films A, C | Compound films (A) and (C) | 140° C. 1 minute | Simultaneous biaxial | 5 | 3.5 |
| Stretched film B | Compound film (B) | 170° C. 4 minutes | | 5 | 3 |
| Stretched film D | Coextruded film A (non-stretched) | 150° C. 4 minutes | | 10 | 4 |
| Stretched film E | Coextruded film B (non-stretched) | 150° C. 10 seconds | | 10 | 3 |

Stretched Film for Reinforcing Strength F

Oriented nylon film;

Emblem available from Unitika Ltd. (thickness 15 μm)

Heat-Sealable Resin Layer Film (Sealant)

CPP (A);

Polypropylene resin sealant film

ZK 401 available from Toray Advanced Film Co., Ltd.

Thickness: 70 μm

CPP (B);

Polypropylene resin sealant film

ZK 500 available from Toray Advanced Film Co., Ltd.

Thickness: 70 μm

CPP (C) and (D);

The polypropylene resin sealant films CPP (C) and CPP (D) were formed as follows by using the following materials.

Block PP (d1)

PC480A available from SunAllomer Ltd.

MFR (230° C.): 2.0 g/10 min

LLDPE (e1)

ULTZEX 2022L available from Prime Polymer Co., Ltd.

MFR (190° C.): 2.0 g/10 min

Density: 919 kg/m$^3$

α-Olefin species: 4-methylpentene-1

LLDPE (e2)

TAFMER A1085S available from Mitsui Chemicals, Inc.

MFR (190° C.): 1.2 g/10 min

Density: 885 kg/m$^3$

α-olefin species: butene-1

A resin was dry-blended in each composition and fed into a hopper of a single-screw extruder with a T-die. The dry-blended material was melt-kneaded in the extruder, discharged from a T-die into a film shape, brought into contact with a cooling roll at 60° C., and solidified to produce the film having a thickness of 70 μm. Each composition of the resin and the temperature setting of the cylinder of the extruder are as shown in Tables 5 and 6 below. The resulting CPP was treated by corona discharge, and the surface was hydrophilized.

TABLE 5

| | Composition ratio (weight ratio) |
|---|---|
| CPP (C) | d1/e1 = 86/14 |
| CPP (D) | d1/e2 = 95/5 |

TABLE 6

| | C1 (° C.) | C2 (° C.) | C3 (° C.) | C4 (° C.) | T die (° C.) | Cooling roll (° C.) |
|---|---|---|---|---|---|---|
| CPP (C) CPP (D) | 160 | 210 | 220 | 220 | 220 | 60 |

Melting Point Measurement

DSC 2500 available from TA Instruments was used.

The temperature rising rate was 10° C./min, and the melting point was determined at a peak top.

Film Thickness Measurement

The film thicknesses of the compound films (A) to (C), the multilayer film, the strength reinforcing layers (A) to (D), and the CPP (C) and (D) were evaluated with a film thickness meter.

The film thickness of each layer of the multilayer film and the strength reinforcing layer (D) was calculated by the following method.

An ultramicrotome available from Leica Corporation equipped with an ultra-thin section producing device (EM UC7) and a freezing system (EM FC7) was used. Sections were cooled at −140° C. and cut. This sample was observed with SEM (S-3400N) available from Hitachi High-Technologies Corporation at 400× and 1000× magnifications.

The film thickness of each layer of the strength reinforcing layer (D) was derived from the following calculation formula.

$$\text{Film thickness of each layer of strength reinforcing layer } (D) = a \cdot b/c$$

Where a is the film thickness of each layer of the multilayer film and b is the thickness of the oriented multilayer film, and c is the film thickness of the multilayer film.

Presence of Oriented Crystals

Using a fully automatic multipurpose X-ray diffractometer (SmartLab) available from Rigaku Corporation, the presence or absence of oriented crystals corresponding to the position of the seal portion was determined. The measurement range was 5 to 40 degrees. A sample was produced by heating a film for strength reinforcement at 190° C., and a sample in which X-ray diffraction was observed in an arc shape was defined as a sample including oriented crystals.

Adhesive

Urethane adhesive; available from TOYO Morton

Coating liquid

Polyester polyol/polyisocyanate/ethyl acetate =66/6.3/70

Epoxy adhesive; MAXIVE available from MITSUBISHI GAS CHEMICAL COMPANY, INC.

Coating liquid

Epoxy resins M-100/polyamine C-93T/mixed solvent =5.4/18.6/60

Mixed solvent: Methanol/ethyl acetate=9/1

Lamination, bag production, and retort were carried out by the following methods.

Laminate

The adhesive coating liquid was applied to the film by using a bar coater. The coating amount was about 3.5 g/m$^2$ in terms of solids.

The substrate film, the stretched films for reinforcing strength A to F, and the CPP (A) to (D) were laminated by a dry lamination method to obtain a multilayer film. After lamination, the laminate was cured at 50° C. for 4 days.

The stretched films for reinforcing strength D and E were formed of stretched films of Ny/ad/PP, and the stretched film for reinforcing strength D was laminated in a configuration in which CPP and PP face each other and the stretched film for reinforcing strength E was laminated in a configuration in which CPP and Ny face each other.

Formation of Pouch

The multilayer film obtained above was cut into two pieces of 140 mm×180 mm, filled with 200 g of water, and formed into a pouch. The pouch was formed under the following conditions by using an impulse sealer available from FUJI IMPULSE CO., LTD.

Sealing conditions;

Heating temperature: 190° C.

Heating time: 1.4 s

Cooling: 3.0 s

Seal width: 5 mm

Pouch for Seal Strength Measurement Test (Pouch for Sealant Heat Resistance Test)

A multilayer film having the following layer configuration was produced by a dry lamination method using a urethane adhesive.

Oriented PET film (12 μm)/oriented Ny film (15 μm) /aluminum foil (7 μm)/CPP film (70 μm)

The numerical values in parentheses are thicknesses.

The multilayer film was cut into 2 sheets of 140 mm×180 mm, filled with 200 g of water to form a bag, pouched under the following conditions, and then subjected to retort treatment to obtain a standard pouch used for the seal strength measurement test.

Sealing conditions;
Heating temperature: 220° C.
Heating time: 1.4 s
Cooling: 3.0 s
Seal width: 5 mm
Retort conditions;
Shower type
121° C.×30 minutes Pouch Drop Test The pouches were cooled overnight in a 5° C., and two pouches in a horizontal position were laminated and dropped from a height of 120 cm and measured. The lower pouch was used as a test pouch. As N3, the average value of the number of times of non-breakage was measured.

Measurement of Seal Strength

An autograph (AG-I/30N-10KN) available from Shimadzu Corporation was used as a seal strength measurement tester. The test conditions are as follows:

Test Piece Film:

From a short side (140 mm) of the pouch for the seal strength measurement test, a heat-seal portion was cut out at a right angle into a strip shape having a width of 15 mm.
Six test pieces were prepared.
Atmospheric temperature: 110° C.
Tensile rate: 300 mm/min
Based on this seal strength, the sealant heat resistance was determined according to the following criteria.
○: Seal strength is 10 N or more
x: Seal strength is less than 10 N.

Dynamic Viscoelasticity Measuring Method

The dynamic viscoelasticity was measured using a dynamic viscoelasticity measuring device available from Seiko Instruments Inc. The test conditions are as follows:
Test specimen film: length of 20 mm long and width of 10 mm
Inter-chuck distance: 5 mm
Temperature range: −70° C. to 150° C.
Temperature increase rate: 3° C./min
Frequency: 10 Hz
Tan δ (loss tangent): Determined by a loss elastic modulus/a storage elastic modulus at 5° C.
E' (storage elastic modulus): Determined by a value at 110° C.

Olefin Content in Pouch

The olefin content (mass %) in the pouch was determined by the following equation.

$$\text{Olefin resin content (\%) of the entire pouch} = [1 - (A + B)/C] \times 100$$

wherein
A is the coating amount of the adhesive,
B is the amount of reinforcing resin in the strength reinforcing layer, and
C is the pouch weight.

Example 1

A multilayer film having the following layer configuration was produced by a lamination using a urethane adhesive.

Substrate Film A/Stretched film A/CPP (A)

Using this multilayer film, a pouch was formed by the above-described method, a retort treatment was performed under the above-described conditions, and a bag drop test was performed.

Further, the sealant used was subjected to a seal strength measurement test to evaluate the heat resistance of the sealant.

The test results and the like are shown in Table 7.

Example 2

A multilayer film was produced and a pouch formation and a retort treatment were performed in the same manner as in Example 1 except that the CPP (A) was changed to the CPP (B), various measurements were performed in the same manner as in Example 1, and test results and the like are shown in Table 7.

Example 3

A multilayer film was produced and a pouch formation and a retort treatment were performed in the same manner as in Example 1 except that the CPP (A) was changed to the CPP (C), various measurements were performed in the same manner as in Example 1, and test results and the like are shown in Table 7.

Example 4

A multilayer film was produced and a pouch formation and a retort treatment were performed in the same manner as in Example 1 except that the CPP (A) was changed to the CPP (D), various measurements were performed in the same manner as in Example 1, and test results and the like are shown in Table 7.

Example 5

A multilayer film was produced and a pouch formation and a retort treatment were performed in the same manner as in Example 1 except that the stretched film A used in Example 1 was changed to the stretched film B, various measurements were performed in the same manner as in Example 1, and test results and the like are shown in Table 7.

Example 6

A multilayer film was produced and a pouch formation and a retort treatment were performed in the same manner as in Example 1 except that the stretched film A used in Example 1 was changed to the stretched film C, various measurements were performed in the same manner as in Example 1, and test results and the like are shown in Table 7.

Example 7

A multilayer film was produced and a pouch formation and a retort treatment were performed in the same manner as in Example 6 except that the CPP (A) was changed to the CPP (B), various measurements were performed in the same manner as in Example 1, and test results and the like are shown in Table 7.

Example 8

A multilayer film was produced and a pouch formation and a retort treatment were performed in the same manner as in Example 1 except that the stretched film A used in Example 1 was changed to the stretched film D, various measurements were performed in the same manner as in Example 1, and test results and the like are shown in Table 7.

Example 9

A multilayer film was produced and a pouch formation and a retort treatment were performed in the same manner as in Example 8 except that the CPP (A) was changed to the CPP (B), various measurements were performed in the same manner as in Example 1, and test results and the like are shown in Table 7.

TABLE 7

| | Layer configuration | | | | Number of | PO |
| | Outermost layer | Intermediate layer | Sealant (CPP) | Adhesive | Oriented crystal | times of non-breakage | content (%) |
|---|---|---|---|---|---|---|---|
| Example 1 | Substrate film A | Stretched film A | CPP (A) | Urethane | Present | 15 | >80 |
| Example 2 | Substrate film A | Stretched film A | CPP (B) | Urethane | Present | >20 | >80 |
| Example 3 | Substrate film A | Stretched film A | CPP (C) | Urethane | Present | >20 | >80 |
| Example 4 | Substrate film A | Stretched film A | CPP (D) | Urethane | Present | 12 | >80 |
| Example 5 | Substrate film A | Stretched film B | CPP (A) | Urethane | Present | >20 | >80 |
| Example 6 | Substrate film A | Stretched film C | CPP (A) | Urethane | Present | 13 | >80 |
| Example 7 | Substrate film A | Stretched film C | CPP (B) | Urethane | Present | >20 | >80 |
| Example 8 | Substrate film A | Stretched film D | CPP (A) | Urethane | Present | 12 | >80 |
| Example 9 | Substrate film A | Stretched film D | CPP (B) | Urethane | Present | >20 | >80 |

Example 10

A multilayer film was produced and a pouch formation and a retort treatment were performed in the same manner as in Example 1 except that the stretched film A used in Example 1 was changed to the stretched film F, various measurements were performed in the same manner as in Example 1, and test results and the like are shown in Table 8.

Example 11

A multilayer film was produced and a pouch formation and a retort treatment were performed in the same manner as in Example 10 except that the CPP (A) was changed to the CPP (C), various measurements were performed in the same manner as in Example 1, and test results and the like are shown in Table 8.

Example 12

A multilayer film was produced and a pouch formation and a retort treatment were performed in the same manner as in Example 10 except that the layer configuration of the multilayer film was changed as follows, various measurements were performed in the same manner as in Example 1, and test results and the like are shown in Table 8.
Stretched Film F/Substrate Film (A)/CPP (A)

Example 13

A multilayer film was produced and a pouch formation and a retort treatment were performed in the same manner as in Example 2 except that lamination was performed by replacing the urethane adhesive with the epoxy adhesive, various measurements were performed in the same manner as in Example 1, and test results and the like are shown in Table 8.

Example 14

A multilayer film was produced and a pouch formation and a retort treatment were performed in the same manner as in Example 13 except that the CPP (B) was changed to the CPP (C), various measurements were performed in the same manner as in Example 1, and test results and the like are shown in Table 8.

Example 15

A multilayer film was produced and a pouch formation and a retort treatment were performed in the same manner as in Example 6 except that lamination was performed by replacing the urethane adhesive with the epoxy adhesive and replacing CPP (A) with CPP (C), various measurements were performed in the same manner as in Example 1, and test results and the like are shown in Table 8.

Example 16

A multilayer film was produced and a pouch formation and a retort treatment were performed in the same manner as in Example 13 except that the stretched film A was changed to the stretched film E, various measurements were performed in the same manner as in Example 1, and test results and the like are shown in Table 8.

Example 17

A multilayer film was produced and a pouch formation and a retort treatment were performed in the same manner as in Example 14 except that the stretched film A was changed to the stretched film E, various measurements were performed in the same manner as in Example 1, and test results and the like are shown in Table 8.

Example 18

A multilayer film was produced and a pouch formation and a retort treatment were performed in the same manner as in Example 13 except that the layer configuration of the multilayer film was changed as follows, various measurements were performed in the same manner as in Example 1, and test results and the like are shown in Table 8.
Substrate Film (A)/Stretched Film F/CPP (B)

Example 19

A multilayer film was produced and a pouch formation and a retort treatment were performed in the same manner as in Example 13 except that the layer configuration of the multilayer film was changed as follows, various measurements were performed in the same manner as in Example 1, and test results and the like are shown in Table 8.
Stretched Film E/Substrate Film (A)/CPP (B)

Comparative Example 4

A multilayer film was produced and a pouch formation and a retort treatment were performed in the same manner as

TABLE 8

| | Layer configuration | | | | | Number | PO |
|---|---|---|---|---|---|---|---|
| | Outermost layer | Intermediate layer | Sealant (CPP) | Adhesive | Oriented crystal | of times of non-breakage | content (%) |
| Example 10 | Substrate film A | Stretched film F | CPP (A) | Urethane | Present | 20 | <80 |
| Example 11 | Substrate film A | Stretched film F | CPP (C) | Urethane | Present | >20 | <80 |
| Example 12 | Stretched film F | Substrate film A | CPP (A) | Urethane | Present | 17 | <80 |
| Example 13 | Substrate film A | Stretched film A | CPP (B) | Epoxy | Present | 17 | >80 |
| Example 14 | Substrate film A | Stretched film A | CPP (C) | Epoxy | Present | 15 | >80 |
| Example 15 | Substrate film A | Stretched film C | CPP (C) | Epoxy | Present | 13 | >80 |
| Example 16 | Substrate film A | Stretched film E | CPP (B) | Epoxy | Present | >20 | >80 |
| Example 17 | Substrate film A | Stretched film E | CPP (C) | Epoxy | Present | >20 | >80 |
| Example 18 | Substrate film A | Stretched film F | CPP (B) | Epoxy | Present | >20 | <80 |
| Example 19 | Stretched film E | Substrate film A | CPP (B) | Epoxy | Present | 11 | >80 |

Comparative Example 1

A multilayer film was produced and a pouch formation and a retort treatment were performed in the same manner as in Example 1 except that the layer configuration of the multilayer film was changed as follows without using the stretched film, various measurements were performed in the same manner as in Example 1, and test results and the like are shown in Table 9.
Substrate Film (A)/CPP (A)

Comparative Example 2

A multilayer film was produced and a pouch formation and a retort treatment were performed in the same manner as in Comparative Example 1 except that the CPP (A) was changed to the CPP (B), various measurements were performed in the same manner as in Example 1, and test results and the like are shown in Table 9.

Comparative Example 3

A multilayer film was produced and a pouch formation and a retort treatment were performed in the same manner as in Comparative Example 1 except that the CPP (A) was changed to the CPP (D), various measurements were performed in the same manner as in Example 1, and test results and the like are shown in Table 9.

Comparative Example 5

A multilayer film was produced and a pouch formation and a retort treatment were performed in the same manner as in Comparative Example 2 except that lamination was performed by using the epoxy adhesive, various measurements were performed in the same manner as in Example 1, and test results and the like are shown in Table 9.

Comparative Example 6

A multilayer film was produced and a pouch formation and a retort treatment were performed in the same manner as in Comparative Example 2 except that the CPP (B) was changed to the CPP (C), various measurements were performed in the same manner as in Example 1, and test results and the like are shown in Table 9.

TABLE 9

| | Layer configuration | | | | | Number | PO |
|---|---|---|---|---|---|---|---|
| | Outermost layer | Intermediate layer | Sealant (CPP) | Adhesive | Oriented crystal | of times of non-breakage | content (%) |
| Comparative Example 1 | Substrate film A | — | CPP (A) | Urethane | Absent | 5 | >80 |
| Comparative Example 2 | Substrate film A | — | CPP (B) | Urethane | Absent | 9 | >80 |
| Comparative Example 3 | Substrate film A | — | CPP (C) | Urethane | Absent | 4 | >80 |
| Comparative Example 4 | Substrate film A | — | CPP (D) | Urethane | Absent | 3 | >80 |
| Comparative Example 5 | Substrate film A | — | CPP (B) | Urethane | Absent | 3 | >80 |
| Comparative Example 6 | Substrate film A | — | CPP (C) | Urethane | Absent | 5 | >80 | in Comparative Example 1 except that the CPP (A) was changed to the CPP (C), various measurements were performed in the same manner as in Example 1, and test results and the like are shown in Table 9.

The loss tangent (tan δ) at 5° C. and the storage elastic modulus (E') at 110° C. in dynamic viscoelasticity measurement of the CPP films (A) to (D) used for formation of the multilayer film are shown in Table 10.

TABLE 10

| CPP film | tanδ | E' (MPa) | Heat resistance of sealant |
|---|---|---|---|
| CPP (A) | 0.059 | > 1 | ○ |
| CPP (B) | 0.083 | Less than 1 | x |
| CPP (C) | 0.072 | > 1 | ○ |
| CPP (D) | 0.065 | > 1 | ○ |

REFERENCE SIGNS LIST

1: Support film
3: Heat-sealable resin layer
5: Multilayer film for packaging
7: Seal portion
9: Contents
10: Packaging bag
11: Substrate film
21: Stretched film for reinforcing strength
23: Adhesive layer

The invention claimed is:

1. A packaging bag, comprising
multilayer films for packaging including a heat-sealable resin layer on a surface, the packaging bag being formed by bonding two of the heat-sealable resin layers of the multilayer films for packaging, wherein
oriented crystals are present in a seal portion formed by bonding the heat-sealable resin layers, wherein the heat-sealable resin layer is a non-stretched molded body containing an impact polypropylene component, and has a loss tangent (tan δ) of more than 0.0594 at 5° C. and a storage elastic modulus (E') of more than 1 MPa at 110° C. in a test measurement of dynamic viscoelasticity.

2. The packaging bag according to claim 1, wherein the multilayer films for packaging include a stretched film for reinforcing strength for allowing the oriented crystals to be present in the seal portion.

3. The packaging bag according to claim 2, wherein the stretched film for reinforcing strength contains an olefin resin and a reinforcing resin having a melting point higher than a melting point of the olefin resin.

4. The packaging bag according to claim 3, wherein the stretched film for reinforcing strength is formed of a blended material of the olefin resin and the reinforcing resin.

5. The packaging bag according to claim 3, wherein the stretched film for reinforcing strength is a laminate of a layer of the olefin resin and a layer of the reinforcing resin.

6. The packaging bag according to claim 3, wherein the reinforcing resin is polyamide, polyester, or an ethylene-vinyl alcohol copolymer.

7. The packaging bag according to claim 2, wherein the multilayer film for packaging includes a substrate film for improving recyclability in addition to the stretched film for reinforcing strength.

8. The packaging bag according to claim 7, wherein 80 mass % or more of the olefin resin is contained.

9. The packaging bag according to claim 1, wherein the non-stretched molded body contains an impact polypropylene component (A) in which an ethylene-propylene copolymer is dispersed in polypropylene and linear low-density polyethylene (B).

10. The packaging bag according to claim 9, wherein the non-stretched molded body contains 8 mass % or more of a xylene-soluble fraction percentage derived from the ethylene-propylene copolymer.

11. The packaging bag according to claim 9, wherein the non-stretched molded body contains 20 mass % or less of the linear low-density polyethylene (B).

* * * * *